US008370830B2

(12) United States Patent
Jimenez-Salgado et al.

(10) Patent No.: US 8,370,830 B2
(45) Date of Patent: Feb. 5, 2013

(54) DATA ONLY SOLUTION PACKAGE

(75) Inventors: Rolando Jimenez-Salgado, Redmond, WA (US); Bradley Cameron Stevenson, Seattle, WA (US); Thomas Karl Gersten, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 276 days.

(21) Appl. No.: 12/821,159

(22) Filed: Jun. 23, 2010

(65) Prior Publication Data

US 2011/0321037 A1    Dec. 29, 2011

(51) Int. Cl.
*G06F 9/44* (2006.01)
*G06F 9/445* (2006.01)
(52) U.S. Cl. .............. 717/178; 717/120; 717/176
(58) Field of Classification Search .............. None
See application file for complete search history.

(56) References Cited

U.S. PATENT DOCUMENTS

| | | | |
|---|---|---|---|
| 6,282,711 B1 | 8/2001 | Halpern et al. | |
| 6,901,590 B2 | 5/2005 | Narayanaswamy et al. | |
| 6,948,151 B2 | 9/2005 | Gerken | |
| 7,240,101 B2* | 7/2007 | Rich et al. | 717/120 |
| 7,542,759 B2* | 6/2009 | Edwards et al. | 717/178 |
| 2006/0190924 A1 | 8/2006 | Bruening et al. | 717/120 |
| 2007/0283344 A1 | 12/2007 | Apte et al. | |
| 2008/0022276 A1* | 1/2008 | Coppinger et al. | 717/178 |
| 2009/0007097 A1* | 1/2009 | Hinton et al. | 717/176 |
| 2009/0037523 A1* | 2/2009 | Kolke et al. | 709/203 |
| 2009/0171679 A1* | 7/2009 | Salgado et al. | 705/1 |
| 2009/0249279 A1 | 10/2009 | Bourdon | |
| 2009/0287762 A1* | 11/2009 | Gopal et al. | 709/203 |
| 2009/0328032 A1* | 12/2009 | Crow et al. | 717/176 |

OTHER PUBLICATIONS

Microsoft, "Creating Advanced Code-Based Solutions Using Business Connectivity Services", May 2010, Microsoft, pp. 1-6; <http://msdn.microsoft.com/en-us/library/ff394635(d=printer).aspx>.*
Matthew Roche, "Reusing Connections with Data Sources and Configurations", 2012 Microsoft, pp. 1-13; <http://msdn.microsoft.com/en-us/library/cc671619.aspx>.*
Microsoft, "Developing SharePoint Online Solutions", Oct. 2011, pp. 1-6; <http://msdn.microsoft.com/en-us/library/gg454741.aspx>.*
"Optimizing a VM for SharePoint 2010", Retrieved at <<http://blogit.create.pt/blogs/andrevala/>>, Retrieved Date: Mar. 11, 2010, pp. 38.
"SharePoint Memory Dump", Retrieved at <<http://blogs.msdn.com/taj/>>, Retrieved Date: Mar. 11, 2010, pp. 33. Ivan, et al., "Partitionable Services: A Framework for Seamlessly Adapting Distributed Application to Heterogeneous Environments", Retrieved at <<http://domino.watson.ibm.com/comm/research_people.nsf/pages/ivananca.pubs.html/$FILE/hpdc.pdf>>, High Performance Distributed Computing, Proceedings of the 11th IEEE International Symposium on High Performance Distributed Computing, Jul. 24-26, 2002, pp. 10.

* cited by examiner

*Primary Examiner* — Thuy Dao
*Assistant Examiner* — Ben C Wang
(74) *Attorney, Agent, or Firm* — Hope Baldauff Hartman, LLC

(57) ABSTRACT

Technologies are described herein for deploying a data only solution package separate from custom code. In this way, lifecycles of the data only solution package and the custom code can be separately controlled. In an illustrative implementation, the data only solution package is received at a computer. A data specification is installed at the computer through the data only solution package. The data specification may specify a location of an external system storing external data. A data subscription may also be installed at the computer through the data only solution package. The data subscription may include queries for retrieving the external data from the external system and frequency information specifying a frequency at which to retrieve the external data. The external data is retrieved from the external system utilizing the location information, the queries, and the frequency information. A data cache at the computer is populated with the external data.

20 Claims, 4 Drawing Sheets

DATA ONLY SOLUTION PACKAGE

BACKGROUND

End users may desire the ability to extend the user interface ("UI") and/or the user experience ("UX") of current applications in order to view and interact with external data from other sources. For example, an external line-of-business ("LOB") system may contain a list of sales orders from various customers. A business user may desire to surface the customer data in a contact list of a personal information management application operating on a client machine. In this way, the user can view and interact with the customer data offline utilizing the interface of the personal information application.

One way to extend the UI and/or UX of applications is through a developer-created add-in. Add-ins may be provided via a links within a user application or from a remote file share. In addition, add-ins may also be pushed to the client machine via a software distribution service without user action. When the add-ins are installed on the client machine, the business user may expand the UI and/or UX of the personal management application by enabling the add-ins. Each add-in may specialize on a particular business domain (e.g., employee rewards, sales metrics, customer management, etc.). As a result, each add-in may depend on one or more data sets in order to function correctly.

The add-ins may operate based on data stored in a data cache on the client machine. However, existing solutions may not provide a programmatic way to populate the data cache with external data from other sources, such as external LOB systems. As a result, the end user may be given the responsibility to populate the data cache with the external data. The process of populating the data cache can be burdensome and technically difficult. This can be particularly troublesome for business users who may lack technical expertise. Further, if the data cache is not properly populated, the add-in may operate upon and display incorrect information. In some cases, the add-in may completely fail and no information is displayed.

It is with respect to these considerations and others that the disclosure made herein is presented.

SUMMARY

Technologies are described herein for deploying a data only solution package. In particular, a custom code package and a data only solution package may be separately created and separately deployed. The custom code package, such as an application add-in, may include functionality for expanding the UI and/or UX of an application to display and interact with external data stored in a data cache on a client computer. The data only solution package may include functionality for retrieving, populating, and/or updating the data cache with the external data from external data sources. The custom code package may operate in conjunction with the data only solution package to enable the application to present the external data in context with other data natively provided by the application. By separately creating and separately deploying the custom code package and the data only solution package, the lifecycles of the custom code package and the data only solution package can be individually controlled.

In an illustrative implementation of the technologies, the data only solution package is received at a client computer. A data specification is installed at the client computer through the data only solution package. The data specification may include location information specifying a location of an external system storing external data. A data subscription may also be installed at the client computer through the data only solution package. The data subscription may include queries for retrieving the external data from the external system and frequency information specifying a frequency at which to retrieve the external data. The external data is retrieved from the external system utilizing the location information, the queries, and the frequency information. A data cache at the client computer is populated with the external data.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for deploying a data only solution package. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
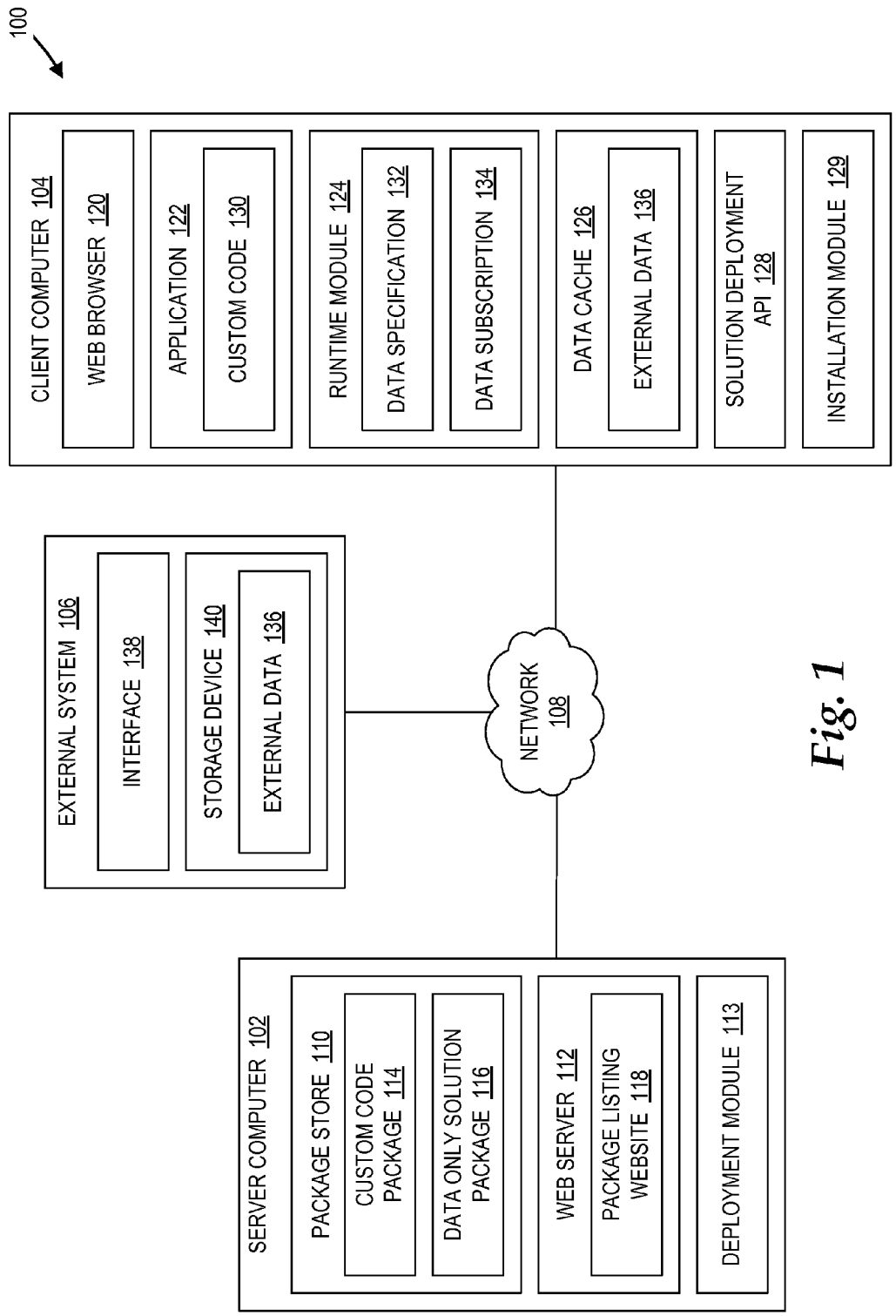
FIG. 1 is a block diagram of an example network architecture configured to deploy a data only solution package, in accordance with one embodiment.

In the following detailed description, references are made to the accompanying drawings that form a part hereof, and which are shown by way of illustration, specific embodiments, or examples. Referring now to the drawings, in which like numerals represent like elements through the several figures, a computing system and methodology for deploying a data only solution package to a client computer will be described. FIG. 1 shows an illustrative network architecture 100 including a server computer 102, a client computer 104, and an external system 106 communicatively coupled via a network 108. The server computer 102 may be configured to include a package store 110, a web server 112, and a deployment module 113. The package store 110 may be configured to store a custom code package 114 and a data only solution package 116. The web server 112 may be configured to provide a package listing website 118. Some other embodiments may not implement the deployment module 113. In such cases, the web server 112 may provide access to a file or a collection of files exposed by the web server 112.

The client computer 104 may be configured to include a web browser 120, an application 122, a runtime module 124, a data cache 126, a solution deployment application programming interface ("API") 128, and an installation module 129. The application 122 may be configured to execute custom code 130, such as an add-in for the application 122. The runtime module 124 may be configured to execute a data specification 132 and a data subscription 134. The data cache 126 is configured to store external data 136. The external system 106 may be configured to include an interface 138 and a storage device 140. The storage device 140 may be configured to store the external data 136 as well.

In some embodiments, the server computer 102 is a package library configured to store multiple developer-created packages. For example, a developer may separately create the custom code package 114 and the data only solution package 116 and publish the custom code package 114 and the data only solution package 116 to the server computer 102. The custom code package 114 may be configured to cause the installation module 129 to install the custom code 130 on the client computer 104. When the custom code 130 is installed, the custom code 130 may be configured to customize the UI and/or UX of the application 122 as well as present the external data 136 according to applicable business logic. The developer may create the custom code package 114 using an integrated development environment ("IDE"), such as VISUAL STUDIO from MICROSOFT CORPORATION.

The data only solution package 116 may be configured to cause the installation module 129 to install the data specification 132 and the data subscription 134 utilized by the runtime module 124. The data specification 132 may contain location information specifying the location of the external system 106 and data structure information specifying the data structures of the external data 136. For example, the data structure information may describe the type of data included in the external data 136, as well as techniques for displaying, reading, creating, updating, and/or deleting the external data 136. The data subscription 134 may contain queries for retrieving the external data 136 from the external system 106 and frequency information indicating a frequency at which the external data 136 is retrieved. In some cases, the full external data 136 is retrieved. In some other cases, only a portion (e.g., the delta since the last retrieval) of the external data 136 is retrieved.

The package listing website 118 may provide links to the developer-created packages, such as the custom code package 114 and the data only solution package 116. Each link provided by the package listing website 118 may correspond to one or more developer-created packages. In particular, each of the custom code packages and the data only solution packages may correspond to a different link. In this way, the lifecycles of the custom code packages and the data only solution packages can be separately controlled. Further, the data only solution packages can be shared between multiple custom code packages. For example, if a data only solution package is updated, then the updated data only solution package can be deployed alone irrespective of the custom code packages.

A user operating the web browser 120 may access the package listing website 118 via a corresponding uniform resource locator ("URL"). When the user selects one of the links, the deployment module 113 may deploy the developer-created package corresponding to the selected link. The deployment module 113 may implement any suitable deployment mechanism for deploying the developer-created packages to the client computer 104. In one example, the deployment module 113 may implement CLICKONCE technology from MICROSOFT CORPORATION. In another example, the deployment module 113 may leverage the Application Cache capabilities of HTML 5.

The application 122 may be any suitable computer application capable of being adapted to implement the custom code 130 in order to expand the UI and/or UX of the application 122. In some embodiments, the application 122 is an office productivity application, such as a word processing application, a spreadsheet application, a personal information management application, and the like. The external system 106 may be any suitable external content source, such as a LOB system and an enterprise resource planning ("ERP") system.

In an illustrative example, the user selects the link corresponding to the custom code package 114. When the user selects the link corresponding to the custom code package 114, the deployment module 113 may deploy the custom code package 114 to the client computer 104. For example, the deployment module 113 may deploy the custom code package 114 to the installation module 129. When the deployment module 113 deploys the custom code package 114 to the client computer 104, the custom code package 114 may cause the installation module 129 to install the custom code 130 on the client computer 104.

In some embodiments, the custom code 130 may contain a dependency to the data only solution package 116. For example, the application 122 may be a spreadsheet application, and the custom code 130 may be configured to create graphs based on sales history data stored in the data cache 126. In this case, the custom code 130 may contain a dependency to a data only solution package that is configured to retrieve the sales history data from the appropriate external source and to populate the data cache 126 with the sales history data.

Continuing the illustrative example, the user opens the application 122 and enables the custom code 130. When the user enables the custom code 130, the custom code 130 may transmit an instruction the deployment module 113 to deploy the data only solution package 116 according to the dependency. Upon receiving the instruction, the deployment module 113 may deploy the data only solution package 116 to the client computer 104. For example, the deployment module 113 may deploy the data only solution package 116 to the installation module 129. When the deployment module 113 deploys the data only solution package 116 to the client computer 104, the data only solution package 116 may cause the installation module 129 to install the data specification 132 and the data subscription 134 on the client computer 104.

The runtime module 124 may utilize the data specification 132 and the data subscriptions 134 to retrieve the external data 136 from the external system 106 and to populate the data cache 126 with the external data 136 retrieved from the external system 106. In particular, as previously described, the data specification 132 may include location information specifying the location of the external system 106, and the data subscriptions 134 may include queries for retrieving the external data 136. Thus, for example, the runtime module 124 may transmit the queries to the interface 138 in order to retrieve the external data 136 from the external system 106.

The solution deployment API 128 may be configured to determine the state of the external data 136 retrieved from the external system 106. In particular, a significant amount of time may lapse before the runtime module 124 completely retrieves the external data 136. The custom code 130 may utilize the solution deployment API 128 to determine the amount of the external data 136 that has been retrieved at a given instance. In some cases, the custom code 130 may be able to utilize a portion of the external data 136 even if the external data 136 has not been completely retrieved. However, in other cases, the custom code 130 may display incorrect information if the external data 136 is not completely available. In such other cases, the custom code 130 may only execute when the solution deployment API 128 indicates that the external data 136 has been completely retrieved.

Although some embodiments described herein utilize APIs for deploying a data solution package, other embodiments include deploying the data solution package declaratively by having a mechanism to configure or "decorate" the custom code with metadata or a set of attributes that specify that a specific data package is required. The client run-time may understand this attribute and then automatically trigger the deployment of the data solution package in order to enable the code to function properly. The client run-time may not allow the code to run until specified data packages have been deployed.

Figure 2:
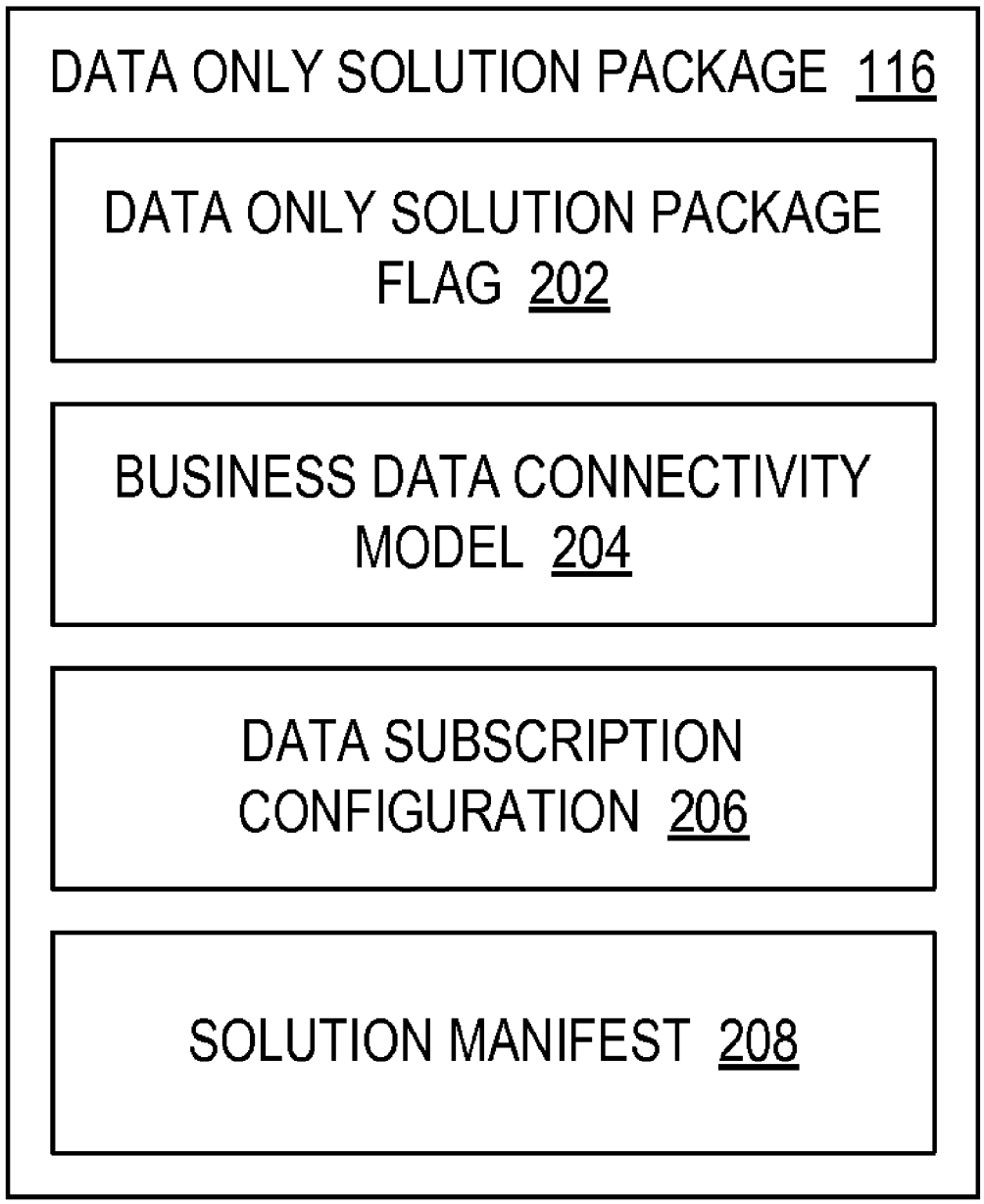
FIG. 2 is a block diagram of an example data only solution package, in accordance with one embodiment.

Referring now to FIG. 2, additional details will be provided regarding the data only solution package 116. FIG. 2 shows an illustrative implementation of the data only solution package 116. The data only solution package 116 includes a data only solution package flag 202, a business data connectivity model 204, a data subscription configuration 206, and a solution manifest 208. In some embodiments, the data only solution package flag 202 is set to a first value (e.g., true) or a second value (e.g., false). The first value may indicate that a given package is a data only solution package, and the second value may indicate that the given package is not a data only solution package. A package structure may include any number of different flags for identifying the package as a custom code package, a data only solution package, or the like. In this way, the package structure can be shared among multiple kinds of packages. Other techniques for identifying a given package as a data only solution package and distinguishing a data only solution package from other types of packages may be similarly implemented.

The business data connectivity model 204 may be configured to cause the installation module 129 to install the data specification 132 on the client computer 104. The business data connectivity model 204 may contain metadata describing the location of the external system 106 and the way in which the runtime module 124 can connect to the external system 106. The data subscription configuration 206 may be configured to cause the installation module 129 to install the data subscription 134 on the client computer 104. The data subscription configuration 206 may specify the queries for retrieving the external data 136 from the external system 106 and the frequency at which the external data 136 is retrieved. The business data connectivity model 204 and the data subscription configuration 206 may be implemented as extensible markup language ("XML") files or any other suitable encoding scheme. The solution manifest 208 may be an inventory list identifying the files, such as the business data connectivity model 204 and the data subscription configuration 206, contained in the data only solution package 116.

Figure 3:
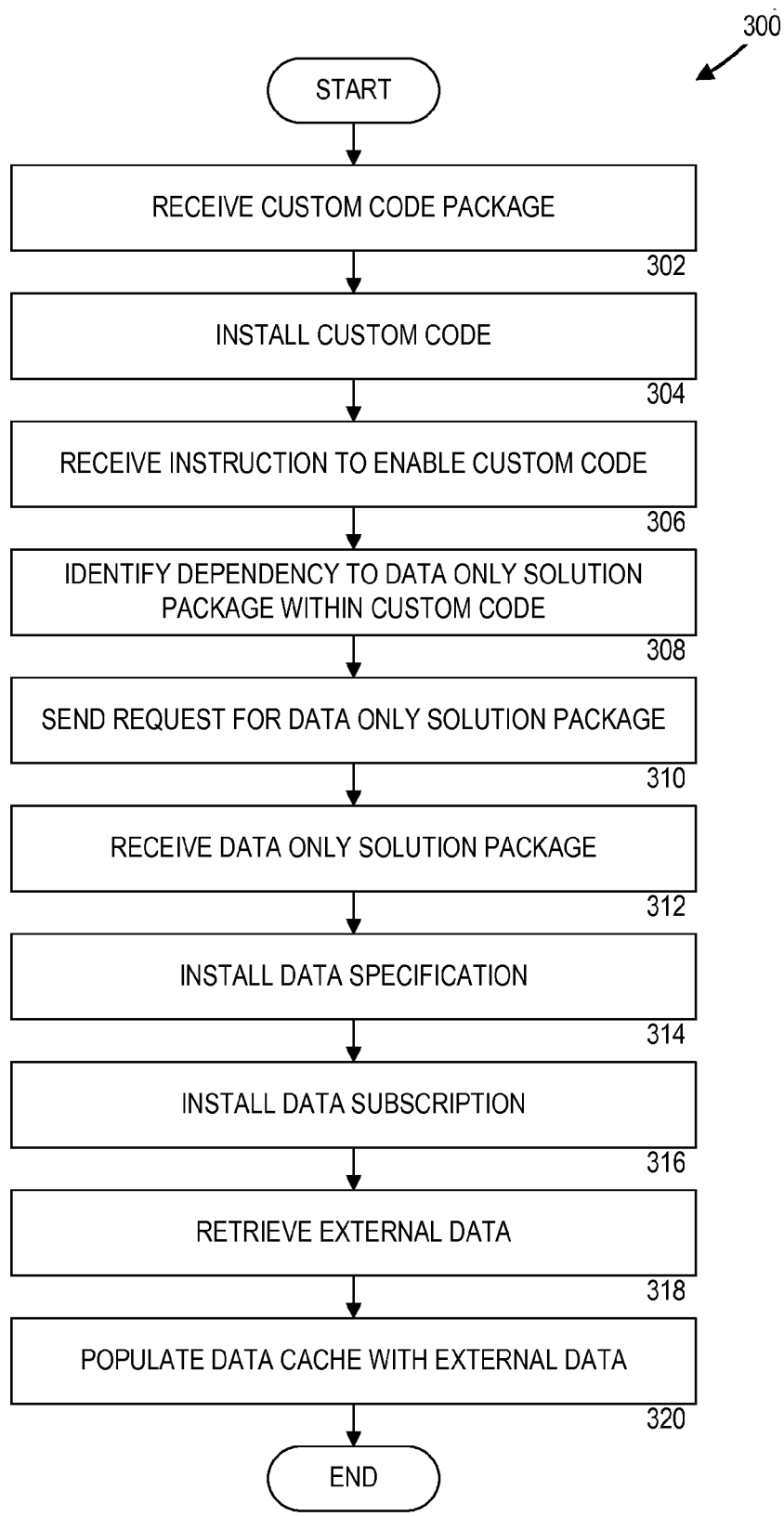
FIG. 3 is a flow diagram showing an example method for deploying a data only solution package, in accordance with one embodiment.

Referring now to FIG. 3, additional details will be provided regarding the operation of the installation module 129, the application 122, and the runtime module 124. In particular, FIG. 3 is a flow diagram illustrating a method provided herein for deploying a data only solution package, such as the data only solution package 116. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may also be performed in a different order than those described herein.

In FIG. 3, a routine 300 begins at operation 302, where the installation module 129 receives the custom code package 114 from the deployment module 113. The custom code package 114 may cause the installation module 129 to install the custom code 130 on the client computer 104. In some embodiments, the custom code 130 may expand a UI and/or UX of the application 122 such that the application 122 can read the external data 136 from the data cache 126 and present the external data 136 through the expanded interface. When the installation module 129 receives the custom code package 114 from the deployment module 113, the routine 300 proceeds to operation 304.

At operation 304, the installation module 129 installs the custom code 130 through the custom code package 114. The routine 300 then proceeds to operation 306, where the application 122 receives an instruction to enable the custom code 130. When a user executes the application 122, the user may expand the UI and/or UX of the application 122 by enabling the custom code 130. For example, the application 122 may provide an option for enabling the custom code 130. In this case, the application 122 may receive the instruction to enable the custom code 130 when the user selects the option. When the application 122 receives the instruction to enable the custom code 130, the routine 300 proceeds to operation 308.

At operation 308, the custom code 130 identifies a dependency to the data only solution package 116. In particular, the custom code 130 may specify that its operation is dependent on the data only solution package 116. For example, the custom code 130 may read the external data 136 from the data cache 126. As a result, the custom code 130 may be dependent on the data only solution package 116, which retrieves the external data 136 from the external system 106 and populates the data cache 126 with the external data 136. When the custom code 130 identifies the dependency to the data only solution package 116 within the custom code 130, the routine 300 proceeds to operation 310.

At operation 310, the custom code 130 sends a request for the data only solution package 116 to the deployment module 113. The routine 300 then proceeds to operation 312, where the installation module 129 receives the data only solution package 116 from the deployment module 113. For example, the deployment module 113 may send the data only solution package 116 to the installation module 129 upon receiving the request for the data only solution package 116 from the custom code 130. The data only solution package 116 may cause the installation module 129 to install the data specification 132 and the data subscription 134. When the installation module 129 receives the data only solution package 116, the routine 300 proceeds to operation 314.

At operation 314, the installation module 129 installs the data specification 132 through the data only solution package 116. The data specification 132 may include location information specifying the location of the external system 106 storing the external data 136. The data specification 132 may further include data structure information specifying the data structures of the external data 136. The data structure information may describe a type of data included in the external data 136 and techniques for displaying, reading, creating, updating, and/or deleting the external data 136. When the installation module 129 installs the data specification 132, the routine 300 proceeds to operation 316.

At operation 316, the installation module 129 installs the data subscription 134 through the data only solution package 116. The data subscription 134 may include queries for retrieving the external data 136 from the external system 106 and frequency information specifying a frequency at which to retrieve the external data 136. When the installation module 129 installs the data subscription 134, the routine 300 proceeds to operation 318.

At operation 318, the runtime module 124 retrieves the external data 136 from the external system based on the location information, the queries, and the frequency information. In particular, the runtime module 124 may access the external system 106 at the location identified by the location information. The runtime module 124 may then retrieve the external data 136 utilizing the queries. For example, the runtime module 124 may send the queries to the interface 138 and receive the external data 136 in response to the queries. The runtime module 124 may transmit these queries at a frequency specified by the frequency information. When the runtime module 124 retrieves the external data 136, the routine 300 proceeds to operation 320.

At operation 320, the runtime module 124 populates the data cache 126 with the external data 136 retrieved from the external system 106. The custom code 130 may read the external data 136 from the data cache 126 and present the external data 136 utilizing the expanded UI and/or UX of the application 122. In particular, the application 122 may present the external data 136 in context with other information natively presented by the application 122. In some embodiments, the custom code 130 may utilize the solution deployment API 128 to determine the amount of the external data 136 retrieved by the runtime module 124 at any given instance. In this way, the custom code 130 can proceed with execution, or in the alternative, delay execution until a sufficient amount of the external data 136 has been retrieved by the runtime module 124.

Figure 4:
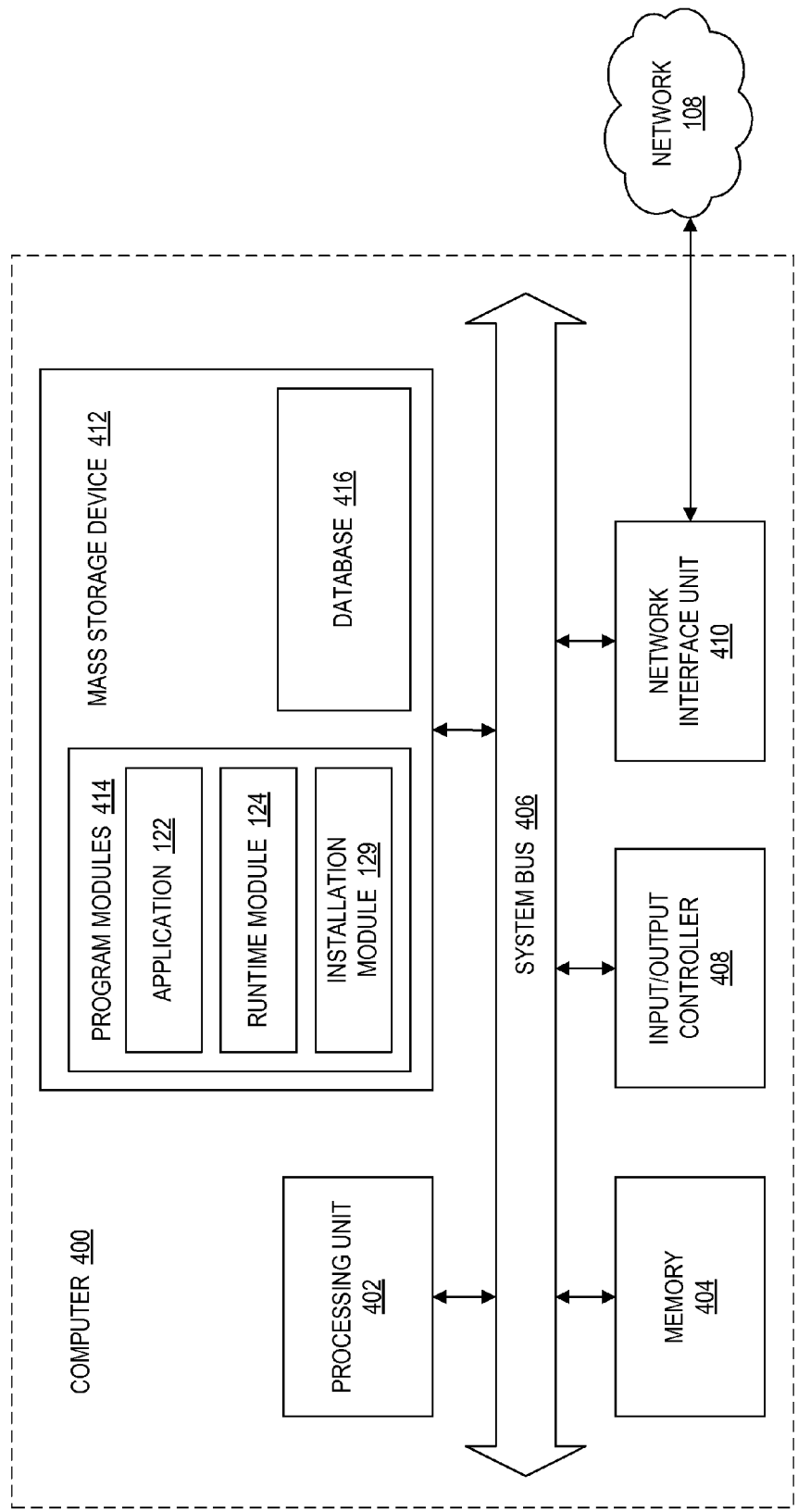
FIG. 4 is a computer architecture diagram showing an illustrative computer hardware architecture for a computing system capable of implementing the embodiments presented herein.

Turning now to FIG. 4, an example computer architecture diagram showing a computer 400 is illustrated. Examples of the computer 400 may include the server computer 102, the client computer 104, and the external system 106. The computer 400 may include a processing unit 402 ("CPU"), a system memory 404, and a system bus 406 that couples the memory 404 to the CPU 402. The computer 400 may further include a mass storage device 412 for storing one or more program modules 414 and a database 416. Examples of the program modules 414 may include the application 122, the runtime module 124, and the installation module 129. The mass storage device 412 may be connected to the CPU 402 through a mass storage controller (not shown) connected to the bus 406. The mass storage device 412 and its associated computer-storage media may provide non-volatile storage for the computer 400. Although the description of computer-storage media contained herein refers to a mass storage device, such as a hard disk or CD-ROM drive, it should be appreciated by those skilled in the art that computer-storage media can be any available computer storage media that can be accessed by the computer 400.

By way of example, and not limitation, computer-storage media may include volatile and non-volatile, removable and non-removable media implemented in any method or technology for storage of information such as computer-storage instructions, data structures, program modules, or other data. For example, computer-storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 400.

According to various embodiments, the computer 400 may operate in a networked environment using logical connections to remote computers through a network such as the network 108. The computer 400 may connect to the network 108 through a network interface unit 410 connected to the bus 406. It should be appreciated that the network interface unit 410 may also be utilized to connect to other types of networks and remote computer systems. The computer 400 may also include an input/output controller 408 for receiving and processing input from a number of input devices (not shown), including a keyboard, a mouse, a microphone, and a game controller. Similarly, the input/output controller 408 may provide output to a display or other type of output device (not shown).

The bus 406 may enable the processing unit 402 to read code and/or data to/from the mass storage device 412 or other computer-storage media. The computer-storage media may represent apparatus in the form of storage elements that are implemented using any suitable technology, including but not limited to semiconductors, magnetic materials, optics, or the like. The computer-storage media may represent memory components, whether characterized as RAM, ROM, flash, or other types of technology. The computer-storage media may also represent secondary storage, whether implemented as hard drives or otherwise. Hard drive implementations may be characterized as solid state, or may include rotating media storing magnetically-encoded information.

The program modules 414 may include software instructions that, when loaded into the processing unit 402 and executed, cause the computer 400 to deploy a data only solution package. The program modules 414 may also provide various tools or techniques by which the computer 400 may participate within the overall systems or operating environments using the components, flows, and data structures discussed throughout this description. For example, the program modules 414 may implement interfaces for deploying a data only solution package.

In general, the program modules 414 may, when loaded into the processing unit 402 and executed, transform the processing unit 402 and the overall computer 400 from a general-purpose computing system into a special-purpose computing system customized to deploy a data only solution package. The processing unit 402 may be constructed from any number of transistors or other discrete circuit elements, which may individually or collectively assume any number of states. More specifically, the processing unit 402 may operate as a finite-state machine, in response to executable instructions contained within the program modules 414. These computer-executable instructions may transform the processing unit 402 by specifying how the processing unit 402 transitions between states, thereby transforming the transistors or other discrete hardware elements constituting the processing unit 402.

Encoding the program modules 414 may also transform the physical structure of the computer-storage media. The specific transformation of physical structure may depend on various factors, in different implementations of this description. Examples of such factors may include, but are not limited to: the technology used to implement the computer-storage media, whether the computer-storage media are characterized as primary or secondary storage, and the like. For example, if the computer-storage media are implemented as semiconductor-based memory, the program modules 414 may transform the physical state of the semiconductor memory, when the software is encoded therein. For example, the program modules 414 may transform the state of transistors, capacitors, or other discrete circuit elements constituting the semiconductor memory.

As another example, the computer-storage media may be implemented using magnetic or optical technology. In such implementations, the program modules 414 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope of the present description, with the foregoing examples provided only to facilitate this discussion.

Based on the foregoing, it should be appreciated that technologies for deploying a data only solution package are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for deploying a data only solution package, the computer-implement method comprising computer implemented operations for:
   identifying, at a client computer, a dependency to the data only solution package;
   sending, from the client computer, a request for the data only solution package;
   receiving, at the client computer, the data only solution package;
   installing, at the client computer, a data specification through the data only solution package, the data specification including location information specifying a location of an external system storing external data;
   installing, at the client computer, a data subscription through the data only solution package, the data subscription including queries for retrieving the external data from the external system and frequency information specifying a frequency at which to retrieve the external data;
   retrieving, at the client computer, the external data from the external system utilizing the location information, the queries, and the frequency information; and
   populating, at the client computer, a data cache with the external data.

2. The computer-implemented method of claim 1, the computer-implemented method comprising further computer-implemented operations for:
   receiving, at the client computer, a custom code package; and
   installing, at the client computer, custom code through the custom code package, the custom code expanding a user interface or user experience of an application executing on the client computer to read the external data from the data cache and to present the external data.

3. The computer-implemented method of claim 2, the computer-implemented method comprising further computer-implemented operations for, after receiving at the client computer the custom code package, and before receiving at the client computer the data only solution package:
   receiving, at the client computer, an instruction to enable the custom code;
   in response to receiving the instruction, identifying a dependency to the data only solution package within the custom code; and
   sending, from the client computer to a server computer, a request for the data only solution package;
   wherein receiving, at the client computer, the data only solution package comprises upon sending the request to the server computer, receiving, at the client computer, the data only solution package from the server computer.

4. The computer-implemented method of claim 2, the computer-implemented method comprising further computer-implemented operations for:
   receiving, at the client computer, an instruction to execute the custom code;
   determining whether the external data has been completely retrieved; and
   upon determining that the external data has been completely retrieved, executing the custom code.

5. The computer-implemented method of claim 1, wherein the data specification further includes data structure information specifying the data structures of the external data.

6. The computer-implemented method of claim 5, wherein the data structure information describes a type of data included in the external data and techniques for displaying, reading, creating, updating, or deleting the external data.

7. The computer-implemented method of claim 1, wherein the data only solution package is deployed via a web page containing a link to the data only solution package.

8. The computer-implemented method of claim 2, wherein the application comprises an office productivity application.

9. The computer-implemented method of claim 1, wherein the installed data specification and the installed data subscription are automatically updated without user intervention.

10. The computer-implemented method of claim 1, wherein the external system comprises a line of business (LOB) system or an enterprise resource planning (ERP) system.

11. A computer system, comprising:
    a processor;
    a memory communicatively coupled to the processor;
    a data cache; and
    a runtime module (i) which executes in the processor from the memory and (ii) which, when executed by the processor, causes the computer system to deploy a data only solution package by identifying, at a client computer, a dependency to the data only solution package, sending, from the client computer to a server computer, a request for the data only solution package, receiving, via a network, the data only solution package from the server computer, installing a data specification through the data only solution package, the data specification including location information specifying a location of an external system storing external data, installing a data subscription through the data only solution package, the data subscription including queries for retrieving the external data from the external system and frequency information specifying a frequency at which to retrieve the external data, retrieving, via the network, the external data from the external system utilizing the location information and the queries and according to the frequency information, and populating the data cache with the external data.

12. The computer system of claim 11, wherein the runtime module, when executed by the processor, causes the computer system to deploy a data only solution package by further receiving, via the network, a custom code package from the server computers; and installing custom code through the custom code package, the custom code expanding a user interface or user experience of an application executing on the computer system to read the external data from the data cache and to present the external data.

13. The computer system of claim 12, wherein the runtime module, when executed by the processor, causes the computer system to deploy a data only solution package by further receiving an instruction to enable the custom code;

in response to receiving the instruction, identifying a dependency to the data only solution package within the custom code; and sending, via the network, a request for the data only solution package to the server computer;

wherein receiving, via the network, the data only solution package from the server computer comprises upon sending the request to the server computer, receiving, via the network, the data only solution package from the server computer.

14. The computer system of claim 11, wherein the computer system further comprises a solution deployment application program interface (API) configured to determine an amount of the external data that has been retrieved by the runtime module.

15. The computer system of claim 11, wherein the data only solution package comprises a data only solution package flag distinguishing the data only solution package from other types of packages, a business data connectivity model installing the data specification, a data subscription configuration installing the data subscription, and a solution manifest comprising an inventory list of files contained in the data only solution package.

16. A computer-readable storage medium, which is not a signal, having computer-executable instructions stored thereon which, when executed by a computer, cause the computer to:

receive, at a client computer, a custom code package from a server computer;

install, at the client computer, custom code through the custom code package, the custom code expanding a user interface or user experience of an application executing on the client computer to read the external data from the data cache and to present the external data;

receive, at the client computer, an instruction to enable the custom code;

in response to receiving the instruction, identify a dependency to a data only solution package within the custom code;

send, from the client computer to the server computer, a request for the data only solution package;

upon sending the request for the data only solution package, receive, at the client computer, the data only solution package;

install, at the client computer, a data specification through the data only solution package, the data specification including location information specifying a location of an external system storing external data;

install, at the client computer, a data subscription through the data only solution package, the data subscription including queries for retrieving the external data from the external system and frequency information specifying a frequency at which to retrieve the external data;

retrieve, at the client computer, the external data from the external system utilizing the location information and the queries and according to the frequency information; and populate, at the client computer, a data cache with the external data.

17. The computer-readable storage medium of claim 16, having further computer-executable instructions stored thereon which, when executed by a computer, cause the computer to:

receive, at the client computer, an instruction to execute the custom code;

determine, via a solution deployment application program interface (API), whether the external data has been completely retrieved; and upon determining that the external data has been completely retrieved, execute the custom code.

18. The computer-readable storage medium of claim 16, wherein the data specification further includes data structure information specifying the data structures of the external data; and wherein the data structure information describes a type of data included in the external data and techniques for displaying, reading, creating, updating, and deleting the external data.

19. The computer-readable storage medium of claim 16, wherein the data only solution package is deployed via a web page containing a link to the data only solution package.

20. The computer-readable storage medium of claim 16, wherein the installed data specification and the installed data subscription are automatically updated without user intervention.

* * * * *